United States Patent [19]

Studer et al.

[11] Patent Number: 5,588,947
[45] Date of Patent: Dec. 31, 1996

[54] APPARATUS AND METHOD FOR TREATING HAZARDOUS WASTE MATERIAL

[75] Inventors: Michael K. Studer, Flower Mound; Thomas J. Zodrow, Grapevine, both of Tex.; Timothy J. Elms, Plant City, Fla.

[73] Assignee: Entact Corporation, Irving, Tex.

[21] Appl. No.: 346,634

[22] Filed: Nov. 29, 1994

[51] Int. Cl.⁶ .............................. A62D 3/00; B09B 3/00
[52] U.S. Cl. .......................... 588/252; 405/128; 588/900
[58] Field of Search ..................... 588/249, 252, 588/256, 900; 405/128; 241/DIG. 38

[56] References Cited

U.S. PATENT DOCUMENTS

| | | | |
|---|---|---|---|
| 4,434,028 | 2/1984 | Eppig et al. | 588/900 X |
| 4,655,916 | 4/1987 | Schlesiger | 405/128 X |
| 4,927,293 | 5/1990 | Campbell | 405/128 |
| 5,196,620 | 3/1993 | Gustin et al. | 588/252 X |
| 5,304,710 | 4/1994 | Kigel et al. | 405/128 X |
| 5,310,285 | 5/1994 | Northcott | 405/128 X |
| 5,405,223 | 4/1995 | Sirevag | 405/128 |

*Primary Examiner*—George A. Suchfield
*Attorney, Agent, or Firm*—Warren & Perez

[57] ABSTRACT

An apparatus and method provides a way of collecting, treating, processing and recycling a variety of hazardous waste material and transforming such materials into a stable, granular nonhazardous substance suitable for safe disposal. The apparatus disclosed combines a variety of separate mechanisms and devices such as vibrating screens, motorized crushers, conveyor systems, and electric or fuel powered motors into a single integrated machine. Chemical additives can be used to treat the waste and bond to any heavy, leachable materials such as lead, copper, cadmium, zinc and other metals and thus lower their leaching characteristics to acceptable nonhazardous levels in compliance with Environmental Protection Agency standards. A concrete additive is added to the waste and the mixture is ground into a manageable substance of uniform texture and consistency.

19 Claims, 4 Drawing Sheets

APPARATUS AND METHOD FOR TREATING HAZARDOUS WASTE MATERIAL

TECHNICAL FIELD

The present invention relates in general to an apparatus and method for treating hazardous waste material and, more particularly, to an apparatus and method of receiving toxic, contaminated and/or hazardous waste and transforming the waste material into a stable, manageable landfill substance.

BACKGROUND OF THE INVENTION

Increases in the amounts and types of hazardous waste materials have spurred real concerns about the destruction of the environment and potential risks to life. Factories, foundries and other industrial complexes typically produce large quantities of solid waste containing heavy metals such as lead, cadmium and zinc as well as other garbage and debris. As a result, new and improved ways of handling, transporting and safely disposing of such materials are needed to help reduce the ecological and health risks associated with hazardous wastes.

While, inland and offshore landfills can be used to bury and dispose of most solid waste, a landfill that was once considered safe and distant can, over time, pose serious health and ecological risks. First, leachable heavy metals such as lead, cadmium, copper and zinc are often mixed in with other waste material. Over time, these substances contaminate and pollute the surrounding environment.

Second, the expense of handling and transporting waste materials can be high since hazardous waste usually must be transported long distances to approved disposal facilities or disposed of in costly incinerators.

Additionally, landfill materials and the existing soil conditions of a particular landfill area vary greatly depending on the geographic site and local industries that utilize a particular site. This results in wide variations in the type of waste materials and the treatment methodology employed. In particular large percentages of rock, granite and hard clay soils interfere with the ability to achieve a stable, uniformly nonleachable material that is easily disposed after treatment. The present invention, however, alleviates these concerns.

Prior methods available for treating hazardous waste include U.S. Letters Pat. No. 5,037,479 which discloses a process for chemically treating solid wastes containing unacceptable levels of leachable metals, such as lead, cadmium and zinc to control leaching under both acidic and non-acidic conditions. The '479 patent teaches a method of mixing a solid waste with at least two additives, such as a pH buffering agent and an acid or salt, to convert the leachable metal into non-leachable form.

Additionally, U.S. Letters Pat. No. 4,124,405 discloses a method of treating wastes in the form of liquids and aqueous sludge and converting such wastes into a solid material.

Further, U.S. Letters Pat. No. 3,837,872 discloses a method of mixing an aqueous solution with waste material causing a reaction that produces a chemically and physically solid product fit for disposal.

While these prior methods can be used to treat hazardous waste and convert or transform it to a less hazardous material, the results achieved by using these prior methods varied depending on the size, weight, composition and dimension of the waste product. Thus, prior methods did not take into account larger sized materials which are more resilient to a given chemical treatment and require longer exposure to the additives for effective treatment.

Until the present invention, there was no way of separating and reducing in size the larger sized materials from other wastes prior to the chemical treatment process. Removal and reduction in size of such materials allows the waste to be more evenly and uniformly treated. This results is an end product that is easier and safer to dispose and easier to transport to an approved disposal facility.

Furthermore, while the prior methods used chemical additives to convert hazardous products into a nonhazardous form, these prior methods did not effectively disperse the chemical additive throughout the entire waste surface area. Unlike the present invention, prior methods did not regulate the size of the waste substance prior to treatment in order to insure that the entire substance is immersed with the chemical additive thus providing for a more thorough treatment process.

Accordingly, it is one aspect of the present invention to provide for an apparatus and method of reducing the size of waste materials to allow for a chemical treatment process that evenly and uniformly treats the waste.

Another aspect of the present invention is its ability to regulate the size of the waste prior to chemical treatment. In accordance with this aspect of the present invention, a series of hammer-like devices are used to break-up the waste into smaller sized portions. Due to their smaller size, these portions will more readily and effectively bond to the chemical additive used during the treatment process resulting in a more effective treatment.

Yet another aspect of the present invention is its ability to cycle waste material through the treatment process as many times as necessary to ensure a uniform and consistent disposable end substance. In accordance with this aspect, vibrating screen type filters are used to extract matter which has not been sufficiently processed through the size reduction phase of the present invention. The extracted matter is then recycled via a recycling unit for further treatment or disposal.

Yet another aspect of the present invention is to produce a manageable nonhazardous substance fit for disposal in situ or transportation to suitable disposal facilities. In accordance with this aspect of the invention, concrete or another similar binding additive is combined with the filtered and broken up waste material and then milled into a fine granular substance. The substance may then be safely disposed of in situ or transported to another location.

SUMMARY OF THE INVENTION

The present invention provides an apparatus and method for transforming hazardous waste materials into a stable, nonhazardous substance. This is accomplished by using a number of mechanical subsystems to receive, separate and break-up the raw waste material and treat it with chemical additives that inhibit the materials' toxic qualities.

In the preferred embodiment, the invention discloses a preliminary conditioning unit comprising a first storage receptacle, a first screening member, a first crushing member and a first holding chamber. Materials are placed in the first storage chamber before being fed to the first screening member via a conveyor, inclined platform or similar transportation device. The first screening member contains one or more screen type filters for extracting, separating and reducing oversized materials. This first screening member may be powered by a combustible or electrical motor causing motion of one or more screen type filters contained within the first screening member.

The screening member is coupled to a first crushing member via an opening large enough to allow the flow of the screened materials. A conveyor, inclined platform or similar transportation device is used to transport the screened materials to the first crushing member. The first crushing member may be powered by a gas, diesel or electric motor.

A first holding chamber, preferably containing chemical additives, is placed near the first crushing member for treatment of the screened materials with the chemical additives. In the preferred embodiment, a flow meter is interspersed between the first holding chamber and the waste material to regulate the release of the chemicals. The first crushing member, flow meter, first holding chamber and chemical additives act together to break-up, smash and crush the waste materials into smaller sized crushed portions. The crushed portions flow out an opening for further processing.

The invention further discloses a screening unit containing a second crushing member, a second screening member, a second holding chamber and a milling member. Crushed portions flow into the second crushing member via a conveyor or inclined platform. The crushed portions are further broken and smashed into smaller crushed portions which are sent to the second screening unit via a conveyor or inclined platform.

The second screening member of the screening unit filters portions which are too large. The filtered materials are sent to a recycling unit which transports them to the preliminary conditioning unit via a series of conveyors, inclined platforms or similar devices. The remaining smaller crushed portions flow out an opening for further processing.

In the preferred embodiment, a binding additive such as concrete is added to the smaller crushed portions to give the smaller crushed portion a stable, consistent texture. The concrete additive is contained within the second holding chamber and a second flow meter regulates dispersement of the concrete additive.

The invention further discloses a milling member which receives the smaller crushed portions via a conveyor, inclined platform or similar device. The milling member contains a plurality of sharp winding extensions arranged in an outward direction from one or more shafts having their axis substantially parallel. A motor is attached to the shafts to cause a rotation about their axis. The rotating action of one or more shafts causes the smaller crushed portions combined with the concrete additive to be ground and sized into fine granules thus forming the stable nonhazardous substance.

The final substance flows out an opening in the milling member where it is ready for disposal. In the preferred embodiment a discharge unit is used to collect and dispense the substance in an orderly and controlled manner.

BRIEF DESCRIPTION OF THE DRAWINGS

Other aspects of the invention and its advantages may be appreciated with reference to the following detailed description taken in conjunction with the appended drawings in which.

DETAILED DESCRIPTION OF THE PREFERRED EMBODIMENT

Figure 1:
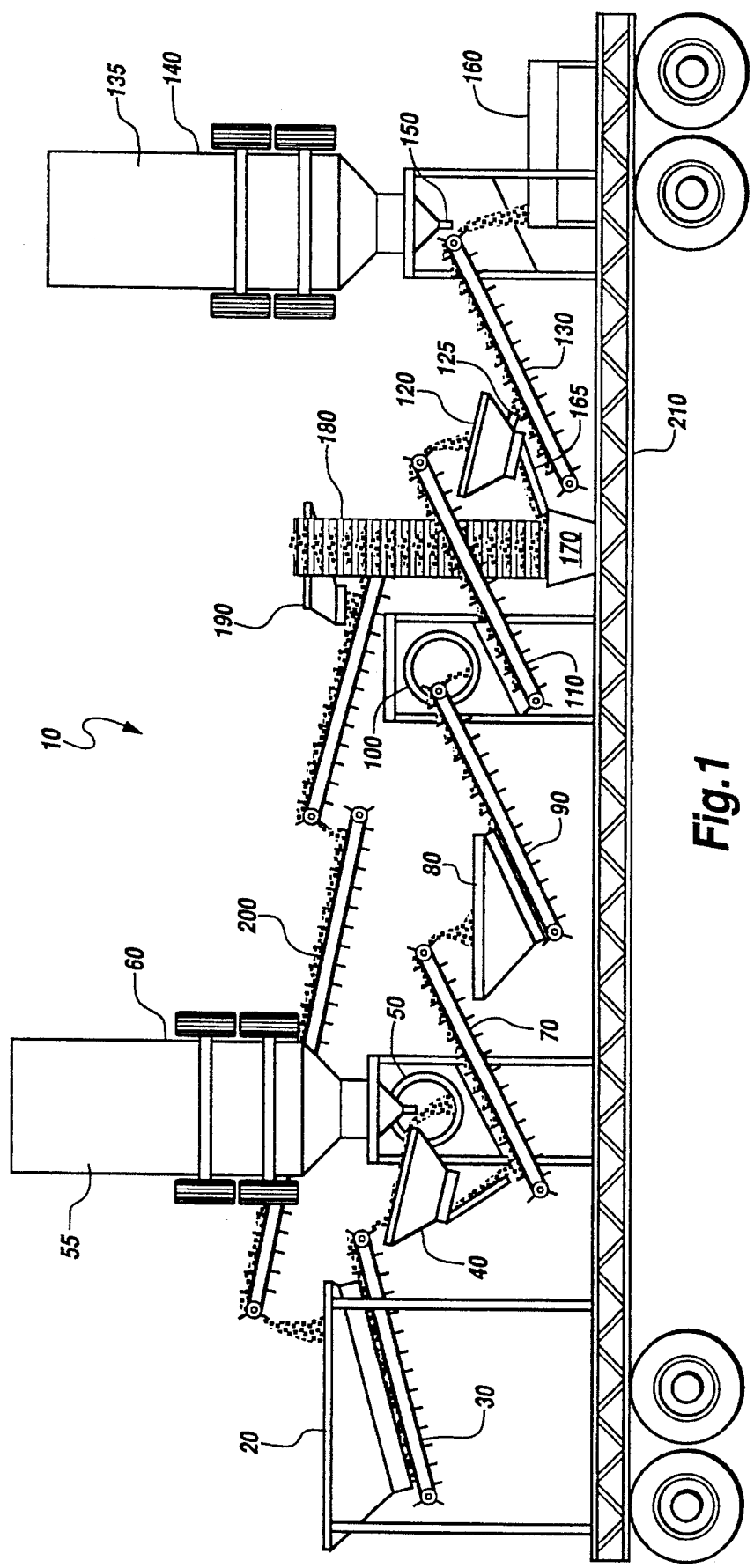
FIG. 1 is a perspective illustration of the overall apparatus according to the present apparatus and method for treating hazardous waste materials.

The present invention is an apparatus and method for transforming and recycling hazardous waste materials into a stable, nonhazardous substance. Reference is now made to FIG. 1 which shows the overall apparatus and operation of the preferred embodiment 10, wherein a receptacle 20 accepts the raw, unprocessed waste materials. A conveyor 30 or functionally similar device is used to transport the materials to a screening member 40 which separates and filters the materials according to particular size.

Screening member 40 may be powered by gas, diesel or electric means to cause a vibrating or "back-and-forth" motion and thus size the waste materials by allowing the smaller particles to continue along the treatment pathway. Larger materials are transported to crushing member 50 where they are sized before further treatment.

Crushing member 50 uses a system of hammer-like devices to break, crush, mix, pulverize, shred and smash the larger waste materials. An additive 55 contained within holding chamber 60 is mixed with the waste which bonds to any heavy metals such as lead, copper, cadmium, zinc and other similar materials to stabilize and control their toxic properties and, specifically, to inhibit their leachability as determined by the U.S. Environmental Protection Agency ("EPA") Toxicity Characteristic Leaching Procedure ("TCLP") found in 40 Code of Federal Regulations Part 261 Appendix II. Chemical additive 55 also facilitate the breaking, crushing, mixing, shredding and smashing action of crushing member 50 which in the preferred embodiment is powered by a gas, diesel or electric motor. The crushed portions are transported along conveyor 70 to receptacle 80 for further processing and recycling.

Crushed portions continue along conveyor 90 to crushing member 100 which further breaks, crushes, mixes, shreds and smashes the waste into smaller sized portions before being transported to screening member 120 along conveyor 110. Screening member 120 uses one or more screen-type filters which move in a vibrating manner to further filter any oversized materials such as any remaining heavy metals from the processing and recycling pathway. The oversized materials are recycled for proper sizing prior to treatment.

The smaller sized and filtered portions flow through opening 125 of screening member 120 and are transported to milling member 160 on conveyor 130. In the preferred embodiment, a binding additive 135 such as concrete is stored in holding chamber 140 and combined with the waste portions prior to or simultaneous to grinding, mixing, and further sizing by milling member 160. The binding additive 135 combines with the wastes portions to create a nonhazardous mixture as measured by the EPA's TCLP. The flow of binding additive 135 from holding chamber 140 unto the waste portions is regulated by a flow meter 150.

Oversized materials removed by screening member 120 flow though an opening 165 into receptacle 170 and subsequently to receptacle 190 via conveyor 180. A conveyor 200 redirects the oversized materials to receptacle 20 where they are reprocessed or disposed.

In the preferred embodiment, a mobile transport 210 is used allowing users to move the overall apparatus 10 to a desired location.

Figure 2:
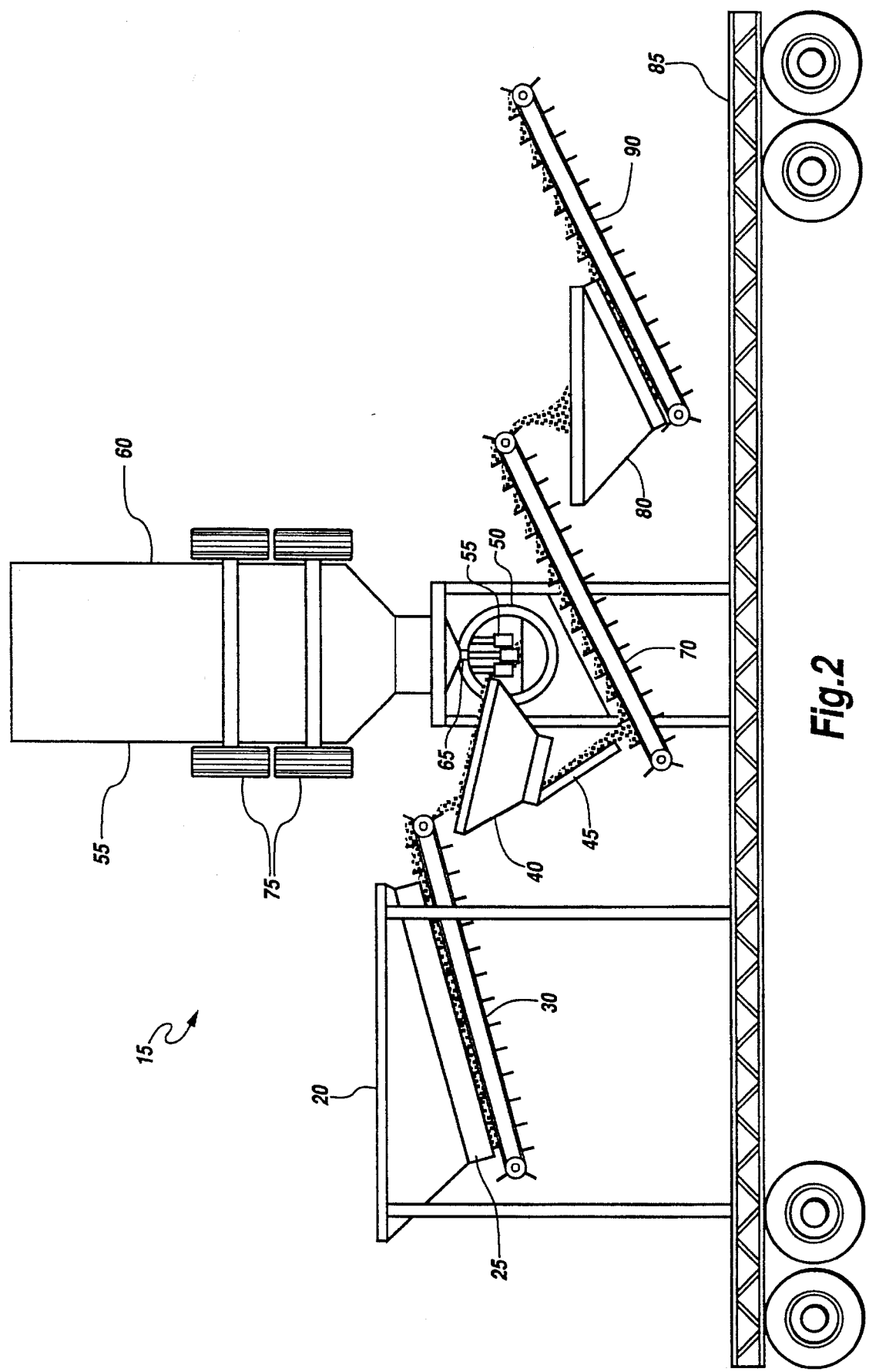
FIG. 2 is a perspective illustration of the preliminary conditioning unit according to the present apparatus and method for treating hazardous waste materials.

Reference is now made to FIG. 2 which illustrates in further detail the preliminary conditioning unit 15 or first stage of the present apparatus and method for processing and recycling materials consisting primarily of screening member 40, crushing member 50 and holding chamber 60. Processing commences when raw waste materials are deposited into receptacle 20 which holds the raw unprocessed waste and dispenses it through an opening 25 unto conveyor 30. Materials are transported to screening member 40 via conveyor 30.

Screening member 40 uses one or more screen type filters to direct larger materials to crushing member 50. Smaller materials flow through screening member 40 via opening 45 unto conveyor 70. Crushing member 50 contains one or more hammer-like devices 55 capable of exerting a large impact on the materials when in motion. The larger materials are broken, crushed, mixed, shredded, pulverized and smashed by the action of crushing member 50 which may be powered by gas, diesel or electrical means.

A chemical additive 55 contained within holding chamber 60 is added to the materials. The flow of chemical additive 55 is regulated by a flow meter 65. The chemical additive 55 bonds with the heavy metals in the waste to lower the leaching of the heavy metals below the nonhazardous material specification proscribed by the EPA TCLP. Since crushing member 50 breaks-up waste into small portions, the chemical additive 55 is evenly distributed across all waste surfaces.

Waste materials are then transported to receptacle 80 via conveyor 70. Conveyor 90 receives materials from receptacle 80 and transports them to the screening unit for further processing and recycling.

In the preferred embodiment, a mobile transport 85 is used allowing users to move the preliminary conditioning unit 15 to a desired location. Cargo wheels 75 can be mounted to chamber 60 for more mobility.

Figure 3:
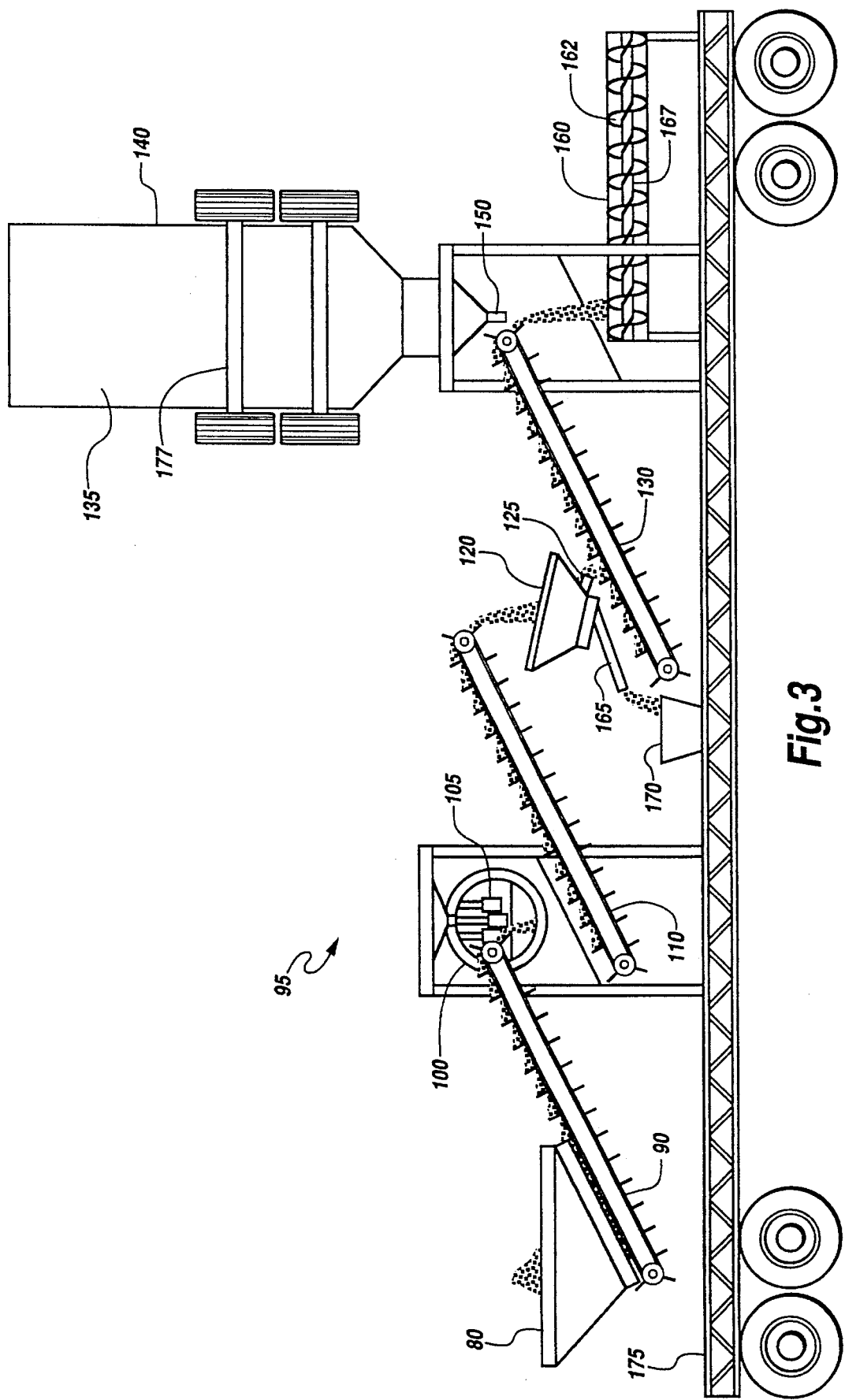
FIG. 3 is a perspective illustration of the screening unit according to the present apparatus and method for treating hazardous waste materials.

In reference to FIG. 3, the screening unit 95 of the present apparatus and method for processing and recycling waste is illustrated wherein materials in receptacle 80 are transported via conveyor 90 to crushing member 100. In the preferred embodiment, crushing member 100 contains one or more moveable heavy hammer-like mallets 105 or similar devices capable of impacting objects with a heavy force. At this point all materials transferred to crushing member 100 are further broken, crushed, mixed, shredded and pulverized.

The wasted portions are then transported to screening member 120 via conveyor 110 where any oversized materials are extracted by use of one or more vibrating screens. All oversized materials flow through a first opening 165 onto receptacle 170 for recycling through the processing pathway to obtain the proper size according to the method of the present invention. The remaining portions flow through a second opening 125 onto conveyor 130 for further processing.

Conveyor 130 transports the remaining waste portions to milling member 160. In the preferred embodiment, milling member 160 uses one or more rotating shafts 167 having winding blade-type extensions 162 that grind, mix and further size the portions into fine granules to form a stable, nonhazardous substance.

In the preferred embodiment an additive 135 such as concrete is contained within a holding chamber 140 and combined with the remaining portions to add a desired consistency to the granules. The flow of additive 135 is regulated by a flow meter 150. The final substance exits an opening of milling member 160.

In the preferred embodiment, a mobile transport 175 and cargo wheels 135 are used allowing the screening unit to be moved to a desired location.

Figure 4:
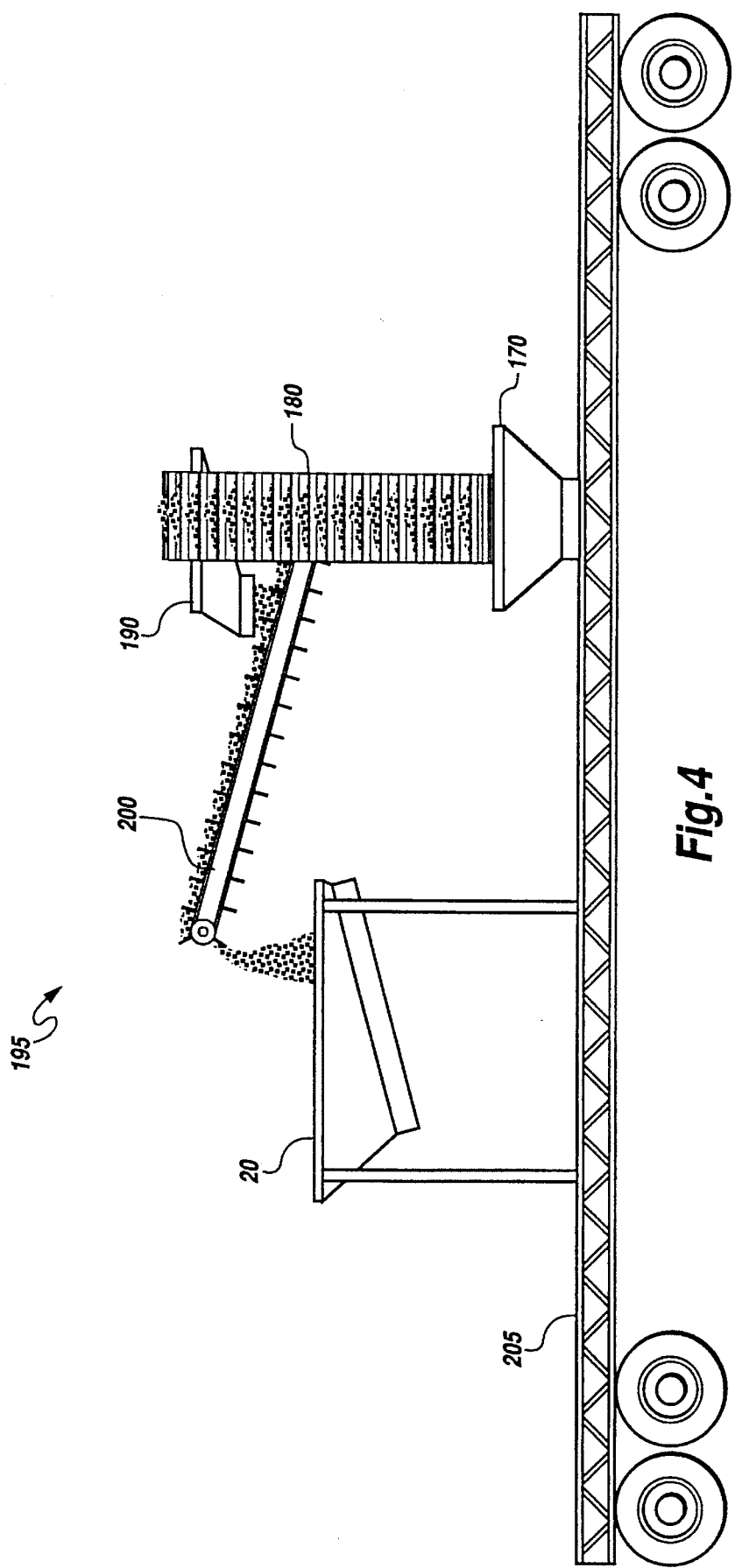
FIG. 4 is a perspective illustration of the recycling unit according to the present apparatus and method for treating hazardous waste materials.

Turning now to FIG. 4, the recycling unit 195 of the present invention is shown wherein the receptacle 170 accepts portions too large to pass through the screening unit 120. A conveyor 180 transmits them to a receptacle 190 which holds and dispenses the materials to a second conveyor 200. Second conveyor 200 transports the materials to receptacle 20 for recycling according to the method of the present invention. A mobile transport 205 can be used to transport the recycling unit 195 to the desired location.

In the detailed description of the preferred embodiment reference is made to the appended drawings which form a part hereof and in which is shown by way of illustration a single embodiment in which the invention may be practiced. It is to be understood that other embodiments may be utilized and changes may be made to both the method and the architecture without departing from the true scope and spirit of the present invention.

We claim:

1. A device for transforming hazardous waste into a stable nonhazardous substance comprising:

a preliminary conditioning unit;

a screening unit coupled to the preliminary conditioning unit via a first conveyor; and a recycling unit coupled to the screening unit via a second conveyor.

2. A device for transforming hazardous waste into a stable nonhazardous substance in accordance with claim 1 wherein the preliminary conditioning unit further comprises:

a receptacle for receiving and holding a variety of waste material;

a screening member coupled to the receptacle via a third conveyor; and a crushing member disposed adjacent to the screening member such that the crushing member may receive waste material from the screening member.

3. A device for transforming hazardous waste into a stable nonhazardous substance in accordance with claim 2 wherein the preliminary conditioning unit further comprises:

a chamber for holding chemical additives; and a meter coupled to the holding chamber for regulating the flow of chemical additives from the holding chamber.

4. A device for transforming hazardous waste into a stable nonhazardous substance in accordance with claim 1 wherein the screening unit further comprises:

a receptacle coupled to the preliminary conditioning unit via the first conveyor;

a crushing member coupled to the receptacle via a third conveyor;

a screening member coupled to the crushing member via a fourth conveyor; and a milling member coupled to the screening member via a fifth conveyor.

5. A device for transforming hazardous waste into a stable nonhazardous substance in accordance with claim 4 wherein the screening unit further comprises:

a chamber for holding additives; and a meter coupled to the holding chamber for regulating the flow of chemical additives from the holding member.

6. A device for transforming hazardous waste into a stable nonhazardous substance in accordance with claim 1 wherein the recycling unit further comprises:

a receptacle coupled to the screening unit via the second conveyor; and a third conveyor coupled to the receptacle for transporting materials to the preliminary conditioning unit.

7. A device for transforming hazardous waste into a stable nonhazardous substance in accordance with claim 1 wherein the preliminary conditioning unit, screening unit and recycling unit are coupled to a mobile transporter.

8. A device for transforming hazardous waste into a stable nonhazardous substance comprising:

a first receptacle for receiving and holding a variety of waste material;

a first screening member coupled to the first receptacle via a first conveyor;

a first crushing member disposed adjacent to the first screening member such that the first crushing member may receive waste material from the first screening member;

a second crushing member coupled to the first screening member and the first crushing member via a second conveyor;

a second screening member coupled to the second crushing member via a third conveyor; and a milling member coupled to the second screening member via a fourth conveyor.

9. A device for transforming hazardous waste into a stable nonhazardous substance in accordance with claim 8 further comprising:

a second receptacle disposed adjacent to the second screening member such that the second receptacle may receive waste material from the second screening member;

a third receptacle coupled to the second receptacle via a fifth conveyor; and an sixth conveyor coupled to the third receptacle for transporting waste materials to the first receptacle for receiving and holding a variety of waste material.

10. A device for transforming hazardous waste into stable nonhazardous substance in accordance with claim 8 further comprising a mobile transporter.

11. A device for transforming hazardous waste into stable nonhazardous substance in accordance with claim 8 wherein the milling member further comprises:

at least one shaft having an axis;

a plurality of sharp winding extensions pointing substantially outward from the shaft; and a motor coupled to the shaft for rotating the shaft about the axis.

12. A method of transforming hazardous waste into a stable nonhazardous substance comprising the steps of:

a) separating the hazardous waste into oversized materials and smaller materials in a first screening member;

b) crushing the oversized materials;

c) adding a bonding additive to the oversized materials;

d) combining the crushed oversized materials with the smaller materials;

e) separating oversized materials from smaller materials in a second screening member;

f) adding a binding additive to the smaller materials to create a mixture; and g) grinding the mixture into the stable, nonhazardous substance.

13. The method of transforming hazardous waste into a stable nonhazardous substance in accordance with claim 12 wherein the binding additive is concrete.

14. The method of transforming hazardous waste into a stable nonhazardous substance in accordance with claim 12 further comprising the steps of:

a) using a set of hammers-like mallets to crush and smash the waste materials;

b) transporting the waste materials to one or more screen type filters;

c) using a motor to vibrate screen type filters in the screening members to extract the oversized materials from the waste materials; and d) using a mill to grind the waste materials into a fine granular substance.

15. The method of transforming hazardous waste into a stable nonhazardous substance in accordance with claim 12 further comprising the additional step of using a meter to regulated the flow of the bonding additive.

16. The method of transforming hazardous waste into a stable nonhazardous substance in accordance with claim 12 further comprising the additional step of breaking the combined materials into smaller materials.

17. A method of transforming hazardous waste into a stable nonhazardous substance comprising the steps of:

a) putting the waste in a storage receptacle;

b) transporting the waste to a first screening member;

c) separating oversized materials from smaller materials;

d) adding a chemical additive to the oversized materials;

e) using a first set of hammer-like mallets to crush and smash the oversized materials in a first crushing member;

f) combining the crushed oversized materials with the smaller materials;

g) using a second crushing member having hammers-like mallets to further crush and smash the combined materials into smaller waste;

h) transporting the smaller waste to a second screening member;

i) separating oversized materials from smaller materials in the second screening member;

j) adding a binding additive to the smaller materials; and k) using a mill to grind the smaller materials into the stable nonhazardous substance.

18. The method of transforming hazardous waste into a stable nonhazardous substance in accordance with claim 17 further comprising the steps of:

a) regulating the flow of the chemical additive with a first flow meter; and b) regulating the flow of the binding additive with a second flow meter.

19. The method of transforming hazardous waste into a stable nonhazardous substance in accordance with claim 17 further comprising after the step of separating oversized materials from smaller materials in the second screening member the additional step of transporting the oversized materials to a recycling unit for further sizing and processing.

* * * * *